US007458214B2

(12) United States Patent
Philippe

(10) Patent No.: US 7,458,214 B2
(45) Date of Patent: Dec. 2, 2008

(54) ELECTRIC MOTOR CARTRIDGE FOR AN ELECTRICALLY ASSISTED TURBOCHARGER

(75) Inventor: Noelle Philippe, Vincey (FR)

(73) Assignee: Honeywell International, Inc., Morristown, NJ (US)

( * ) Notice: Subject to any disclaimer, the term of this patent is extended or adjusted under 35 U.S.C. 154(b) by 211 days.

(21) Appl. No.: 10/553,568

(22) PCT Filed: Apr. 15, 2003

(86) PCT No.: PCT/EP03/03934

§ 371 (c)(1), (2), (4) Date: Oct. 13, 2005

(87) PCT Pub. No.: WO2004/093294

PCT Pub. Date: Oct. 28, 2004

(65) Prior Publication Data

US 2006/0123783 A1 Jun. 15, 2006

(51) Int. Cl.
*F02B 37/00* (2006.01)
*F02B 37/10* (2006.01)
*H02K 9/06* (2006.01)
*H02K 5/04* (2006.01)

(52) U.S. Cl. ............................ 60/608; 290/52; 310/43; 417/406

(58) Field of Classification Search ........... 60/607–609; 290/52; 310/179, 43; 417/406
See application file for complete search history.

(56) References Cited

U.S. PATENT DOCUMENTS

| | | | | |
|---|---|---|---|---|
| 4,253,031 | A | 2/1981 | Frister | 290/52 |
| 4,342,929 | A * | 8/1982 | Horne | 310/43 |
| 4,521,155 | A * | 6/1985 | Osborn | 417/406 |
| 4,850,193 | A * | 7/1989 | Kawamura | 60/608 |
| 5,121,605 | A * | 6/1992 | Oda et al. | 60/608 |
| 5,306,997 | A * | 4/1994 | Akiyama | 60/608 |
| 5,789,841 | A * | 8/1998 | Wang | 310/179 |
| 6,449,950 | B1 * | 9/2002 | Allen et al. | 60/607 |
| 6,845,617 | B1 * | 1/2005 | Allen et al. | 60/607 |
| 6,943,468 | B2 * | 9/2005 | Iida et al. | 310/54 |
| 7,071,585 | B2 * | 7/2006 | Iida et al. | 310/54 |
| 2006/0166778 | A1 * | 7/2006 | Tabata et al. | 475/159 |
| 2006/0225419 | A1 * | 10/2006 | Prusinski et al. | 60/605.1 |
| 2007/0108772 | A1 * | 5/2007 | Shibui et al. | 290/52 |
| 2007/0169747 | A1 * | 7/2007 | Shimizu | 123/434 |

FOREIGN PATENT DOCUMENTS

| | | | |
|---|---|---|---|
| DE | 19518317 | | 5/1995 |
| EP | 304259 | | 8/1988 |
| EP | 388147 | | 3/1990 |
| EP | 420666 | | 9/1998 |
| GB | 2335710 | | 9/1999 |
| JP | 07147750 | A * | 6/1995 |
| JP | 200130176 | A * | 5/2000 |
| JP | 200145468 | A * | 5/2000 |
| WO | WO 0223047 | A1 * | 3/2002 |

* cited by examiner

*Primary Examiner*—Thai-Ba Trieu

(57) ABSTRACT

An electric motor cartridge comprises a first cartridge housing portion (2) and a second cartridge housing portion (3). The cartridge housing portions (2, 3) are coupled together so as to assembly the electric motor cartridge (1) by radially and axially positioning a stator (4) there between.

18 Claims, 2 Drawing Sheets

49 8 47 10 9 7 14 5 44 50 18 30 33 31 35 41 15 6 4 48 32 36 34 23 21 22 29 37 13,26,27 43 42 51 45 19 38,39,40 11 46 28 12,24,25 16,17 20 47 10 9 8 7 16 6 5 27 26 25 28 24 11

ELECTRIC MOTOR CARTRIDGE FOR AN ELECTRICALLY ASSISTED TURBOCHARGER

RELATED APPLICATION

This application is the National Stage entry of and claims the benefit of and priority to Application No. PCT/EP03/03934, filed on Apr. 15, 2003.

FIELD OF INVENTION

The invention relates to an electric motor cartridge, an electric motor which can be accommodated in the electric motor cartridge, a turbocharger electrically assisted by the electric motor and a compressor driven by the electric motor.

BACKGROUND

Turbochargers are well known and widely used in combustion engines. Herein exhaust gas coming from the engine is supplied to a turbine wheel which drives a compressor wheel for compressing air which is charged to the combustion chambers of respective cylinders. The thus compressed air supplies the combustion chamber with more oxygen to enhance the combustion and thus to generate more power. However, as exhaust gas having a smaller pressure is supplied to the turbine wheel when the rotation speed of the engine is low, the air supplied to the combustion chamber is compressed less, which results in a so-called "turbo-lag" for low speed ranges. A known solution for overcoming this turbo-lag is to provide an electric motor for the turbocharger which additionally rotates the compressor wheel when the rotational speed of the engine is low for securing the pressure of the air supplied to the combustion chamber.

According to document U.S. Pat. No. 6,449,950 B1, there is provided a turbo charger having an electric motor for assisting the rotation of a rotor employing a shaft carrying a turbine wheel accommodated in a turbine housing and a compressor wheel accommodated in a compressor housing. The shaft is supported by a bearing accommodated in a center housing and the electric motor is accommodated by both the compressor housing and a motor housing casting. The center housing is located between the motor housing casting and the turbine housing.

SUMMARY

It is the object of the invention to provide an enhanced electric motor cartridge, an electric motor which can be accommodated in the electric motor cartridge, a turbocharger electrically assistable by the electric motor and a compressor driven by the electric motor.

According to one aspect of the invention, the above object is achieved by an electric motor cartridge that includes a first cartridge housing portion (2); and a second cartridge housing portion (3); the cartridge housing portions (2, 3) being coupled together so as to assembly the electric motor cartridge (1) by radially and axially positioning a stator (4) there between.

According to another aspect of the invention, the above object is achieved by an electric motor where the rotor (21) includes two peripheral portions (22, 23) each having a smaller diameter compared to the diameter of a middle portion of the rotor (21) encompassed by the stator, each peripheral portion (22, 23) comprising a circumferential groove (24, 26) provided with a piston ring (25, 27) for sealing between the inside and the outside of the cartridge (1).

According to still another aspect of the invention, the above object is achieved by a turbocharger that includes a turbine housing (18) for accommodating a turbine wheel (29) driven by exhaust gas; a center housing (31) for accommodating a shaft (34) and an exemplary electric motor, the shaft serving as a rotor (21) of the electric motor and extending from the turbine wheel (29) through a journal bearing (35) and the electric motor to a compressor wheel (32); a compressor housing (19) for accommodating the compressor wheel (32); where the compressor wheel (32) is driven by the turbine wheel (29) via the shaft (34) and can additionally be driven by the electric motor, and the electric motor is accommodated in the center housing (31) such that the compressor motor is firmly fixed by connecting the center housing (31) to the compressor housing (19).

According to still another aspect of the invention, the above object is achieved by a compressor that includes a motor housing for accommodating a shaft and an exemplary electric motor, the shaft serving as a rotor of the electric motor and carrying a compressor wheel; and a compressor housing for accommodating the compressor wheel; where the electric motor is accommodated in the motor housing such that the compressor motor is firmly fixed by connecting the motor housing to the compressor housing.

According to the technical solution where that an electric motor assembly includes a first cartridge housing portion (2); and a second cartridge housing portion (3); the cartridge housing portions (2, 3) being coupled together so as to assembly the electric motor cartridge (1) by radially and axially positioning a stator (4) there between, the electric motor cartridge comprises a first cartridge housing portion and a second cartridge housing portion, the cartridge housing portions being coupled together so as to assembly the electric motor cartridge by radially and axially positioning a stator there between. Thus, the stator can be automatically aligned when assembling the cartridge without using additional alignment means.

According to an embodiment of the invention each cartridge housing portion of the electric motor cartridge has a semi-shell shape substantially comprised by a bottom portion and a cylindrical wall portion.

At least one of the cartridge housing portions can be provided with at least one recess portion formed at the inner side of the axial end portion of the cylindrical wall portion which extends at least partially in the circumferential direction of the cylindrical wall for receiving a projection of the stator. In this way a very simple and effective means is provided for engaging the stator between the two housing portions of the cartridge and thereby for radially and axially positioning the stator.

By providing each cartridge housing portion with one recess portion, wherein the recess portions are symmetrically to a plane defined by the abutting tips of the cylindrical wall end portions, positive effects can be reached in view of unwanted forces, such as moments due to eccentricities.

Furthermore each cartridge housing portion can provide a bore in the center of its bottom portion and at least one of the bottom portions can be formed at least partly concave inwardly. The center bore can serve as a guide for a rotor member of the motor which due to the central position of the center bore can be positioned optimally. By forming the bottom portion concavely the cartridge can be adapted to the shape of other members of the turbocharger, such as the compressor wheel or a washer plate, without wasting space for the stator which may be larger in the axial direction compared to the rotor.

Additionally at least one contact area can be formed at each of the cartridge housing portions so as to be in contact with respective counter contact areas of two housings between which the cartridge is fittable. Thus an appropriate engagement of the cartridge between two housing portions is ensured without the need of further means for fixing the cartridge.

For sealing between the cartridge housing and one of the two housings between which the cartridge is fittable in at least one of the cartridge housing portions a circumferentially extending groove can be disposed so as to receive an o-ring. Thus a sealing is automatically provided when inserting the cartridge to the center housing and the sealing means can advantageously be mounted to the outer surface of the cartridge instead of mounting it into a cavity of the center housing, in which the cartridge is inserted.

Additionally cooling slits and any integrated piping for motor cooling can be disposed in at least one of the cartridge housing portions which helps to reduce the number of parts.

As material for the electric motor cartridge punched metal, any polymer potted material, any die casting material or any sand casting material can be used thus to achieve an enhanced burst containment.

Additionally the properties of the material of the cartridge housing can contribute to heat evacuation and heat protection.

Furthermore the material properties of the cartridge housing can contribute to electromagnetic interference protection.

For connecting phases and sensor connections the electric motor cartridge can comprises a connector portion at least one of the electric motor cartridge portions. The connection portion can plug directly to wiring end portions during assembly so as to facilitate the assembly process.

According to a technical solution an electric motor is provided, which comprises an electric motor cartridge according to any of the above mentioned aspects and a rotor being encompassed by the stator. Thus the electric motor is received as a separate function if needed. The encapsulation by the cartridge protects any electrical and electronical components during handling and assembly. Furthermore the electric motor acts as a self centering module that positions the stator and the rotor during the assembly process.

Furthermore the rotor can comprise two peripheral portions each having a smaller diameter compared to the diameter of a middle portion of the rotor encompassed by the stator, wherein each peripheral portion comprises a circumferential groove provided with a piston ring for sealing between the inside and the outside of the cartridge. This further contributes to the self centering function and helps minimising the number of components.

Preferably, mechanical balancing of the rotor can be achieved by material removal areas located on said rotor providing a unitary rotational mass distribution of the rotor. The material removing areas are preferably provided on the circumference of the first and/or second small diameter peripheral portions or on the side of the large diameter portion of the rotor.

For detecting the speed of the rotor the electric motor can comprise a sensor member.

Additionally phases and sensor connections can be arranged in the connector portion such that they plug directly to wiring end connections when assembling the compressor motor so as to facilitate the assembling process.

According to a technical solution a turbocharger comprises an electric motor as described above and further comprises a turbine housing for accommodating a turbine wheel driven by exhaust gas, a center housing for accommodating a shaft and the electric motor, wherein the shaft serves as a rotor of the electric motor and extends from the turbine wheel through a journal bearing and the electric motor to a compressor wheel and a compressor housing for accommodating the compressor wheel, wherein the compressor wheel is driven by the turbine wheel via the shaft and can additionally be driven by the electric motor and wherein the electric motor is accommodated in the center housing such that the compressor motor is firmly fixed by connecting the center housing to the compressor housing. Thus the number of housing parts is minimised as the electric motor provided with the cartridge can directly be inserted into the center housing without the need of further housing parts.

Additionally one of the cartridge housing portions can serve as a seal plate on the journal bearing side and the other cartridge housing portion can serve as a backing plate on the compressor wheel side. Thus the number of components is further minimised.

According to a technical solution a compressor comprises an electric motor as described above and further comprises a motor housing for accommodating a shaft and the electric motor, the shaft serving as a rotor of the electric motor and carrying a compressor wheel and comprises a compressor housing for accommodating the compressor wheel wherein the electric motor is accommodated in the motor housing such that the compressor motor is firmly fixed by connecting the motor housing to the compressor housing. Thus a electrical driven compressor (EDC) can be improved by use of an electric motor being implemented to the cartridge as described above.

Thus, according to the invention, the concept of having a cartridge for the electric motor to be assembled to the turbocharger or the EDC type compressor provides an encapsulation of the electric motor that protects it from oil and water and that contributes to limitation of fire propagation. Additionally the cartridge achieves noise and vibration damping and can be adapted to any motor geometric definition, rotor bearing size and turbocharger size. Furthermore the cartridge concept allows a pre-testing of the electric motor before assembling the same to the turbocharger.

BRIEF DESCRIPTION OF THE DRAWINGS

In the following further technical solutions of the object of the invention are described in detail with reference being made to the enclosed drawings, in which.

DETAILED DESCRIPTION

Figure 1:
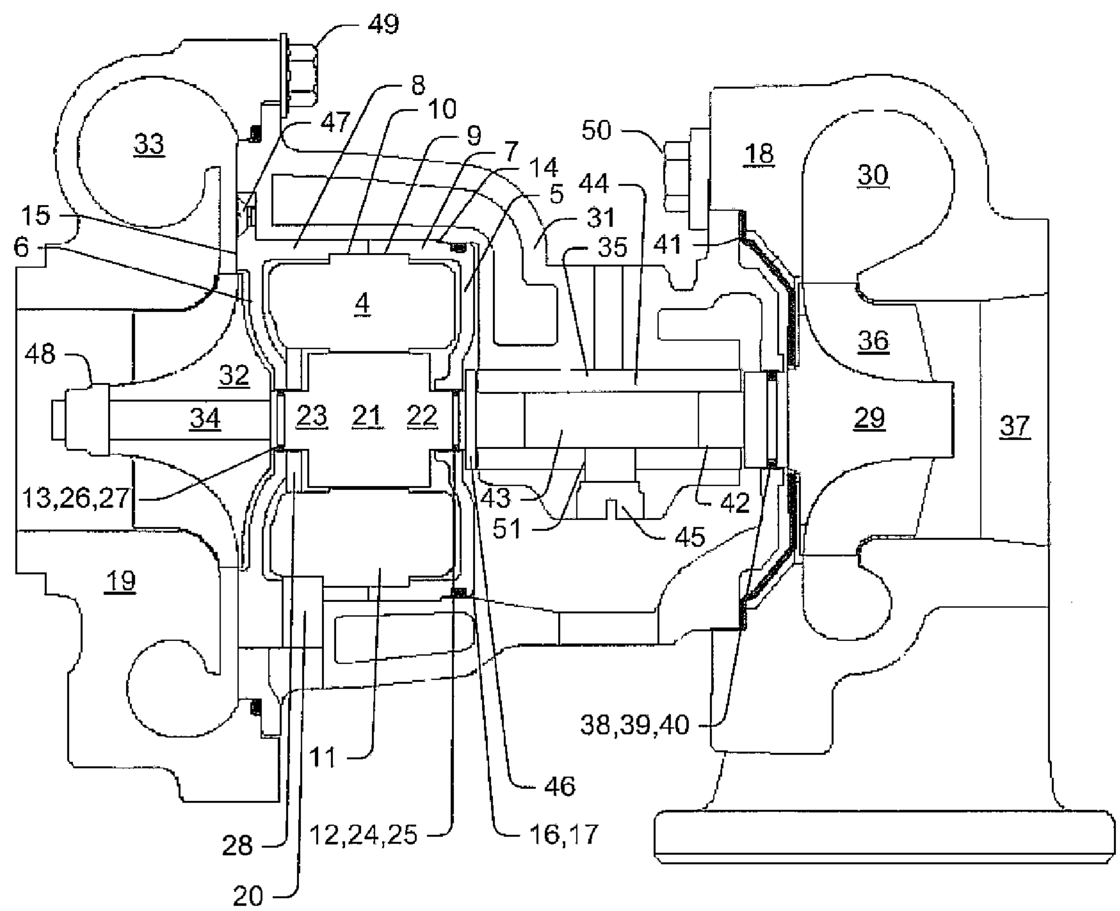
FIG. 1 is a sectional view of the turbocharger having the electric motor cartridge according to one embodiment of the invention.
Figure 2:
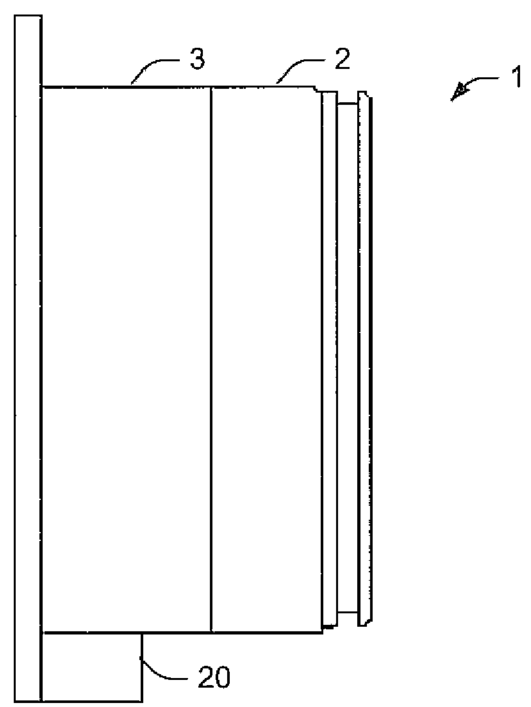
FIG. 2 is a side view of the electric motor cartridge according to one embodiment of the invention.
Figure 3:
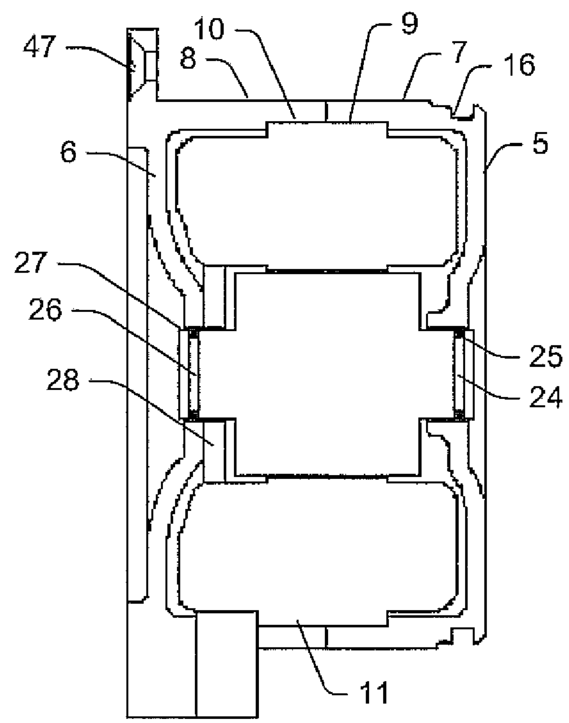
FIG. 3 is a sectional view of the electric motor cartridge shown in FIG. 2.

An electrically assisted turbocharger according to the embodiment shown in FIG. 1 comprises substantially a turbine housing 18 for accommodating a turbine wheel 29, a center housing 31 for accommodating an electric motor cartridge 1 and a compressor housing 19 for accommodating a compressor wheel 32. A shaft 34 extends through the center housing 31 and the electric motor cartridge 1 accommodated therein so as to connect the compressor wheel 32 to the turbine wheel 29 wherein the shaft 34 can serve as a rotor of an electric motor disposed in the cartridge 1.

The electric motor is substantially constituted by a rotor 21, a stator 4 and a sensor 28 which are incorporated into a first cartridge housing portion 2 and a second cartridge housing portion 3 providing also a connector 20 for supplying electrical energy and control signals to the electric motor.

The rotor 21 has a cylindrical shape with an axially extending through hole for inserting the shaft 34 through the rotor 21. A first peripheral portion 22 and a second peripheral portion 23 of the rotor 21 each having a smaller diameter compared to the middle portion thereof are provided with circumferential grooves 24, 26 for accommodating piston rings 25, 27, respectively.

The stator 4 is ring shaped and designed to encompass the rotor 21 coaxially. That means the inner diameter of the stator 4 is slightly greater than the outer diameter of the rotor 21. Furthermore the stator 4 comprises a projection 11 which at least partly extends over the peripheral surface of the rotor 21 at a middle portion in a circumferential direction.

The first cartridge housing portion 2 and the second cartridge housing portion 3 are substantially cup-shaped and a bottom portion 6 of the second cartridge housing portion 3 is concavely curved inwardly so as not to abut against a compressor wheel 32. Furthermore the bottom portion 6 provides a thrust bearing face 15 for abutting against the compressor housing 19 and comprises a central opening 13 for receiving the second peripheral portion 23 of the rotor 21.

A circumferential recess 9 is formed at the inner side of the axial end portion of a cylindrical wall portion 8 of the cup-shaped first cartridge housing portion 3.

Also a bottom portion 5 of the first cartridge housing 2 is concavely curved inside to adapt to a washer plate 46 and has a circumferential recess 10 formed at the axial end portion of the first cartridge housing 2 of a cylindrical cartridge wall portion 7 on the inner side thereof. Furthermore an o-ring 17 is disposed on an outer peripheral position of the transition between the bottom portion 5 and the wall portion 7 of the first cartridge housing 2.

Thus an electric motor cartridge can be easily assembled by first disposing the stator 4 into the second cartridge housing 3 whereby the projection 11 of the stator 4 is received by the recess 10 and thus a gap between the stator 4 and the housing 3 is maintained. Next the sensor 28 having a ring shape can be laid into the ring shaped stator 4 such that an opening of the sensor 28 is aligned with the opening in the second cartridge housing 3 and then the rotor 21 can be inserted into the inside of the ring-shaped stator 4 by inserting the portion 23 having the smaller diameter through the opening of the ring shaped sensor 28 and central opening 13 of the bottom portion 6 of the second cartridge housing portion 3. Now the first cartridge housing 2 can be attached to the rest of the assembly by inserting the portion 22 of the stator 4 into the central opening 12 of the first cartridge housing 2. The piston rings 25 and 27 tightly close the gaps between the first and second portions 22 and 23 of the rotor 21 and the inner peripheral faces of the openings 12, 13 in the respective cartridge housings 2, 3.

Thus, as described above, the electric motor cartridge is assembled without being mounted to the turbocharger. That means, the electric motor cartridge can be produced in a separate process for being mounted later to the turbocharger.

Next, the turbocharger having the electric motor cartridge is described.

The shaft 34 of the turbocharger is connected to a turbine wheel 29 accommodated in the turbine housing 18. Exhaust gas enters the turbine housing 18 through a volute 30 to drive the turbine wheel 29 through the turbine blades 36 and exits through an outlet 37. The turbine includes a hub portion 38 that incorporates a groove 39 to retain a piston ring 40. A heat shroud 41 is engaged between the turbine housing 18 and the center housing 31 for thermal aerodynamic control enhancement. The shaft 34 includes further a bearing portion 43 having lands 42. A journal bearing 35 is carried in a bearing bore 44 of the center housing 31. The bearing is semi-floating, having journals at each end with lubrication and film damper relief portions. A central shoulder incorporates an aperture 43 to receive a pin 45 to restrain rotation of the bearing.

On the side of the journal bearing 35 opposite to the turbine 29 a thrust washer 46 is disposed. The electric motor cartridge is slid over the shaft 34 such that the end face of the first peripheral portion 22 of the rotor 21 abuts against the thrust washer 46. In this state the electric motor cartridge is entirely disposed inside the center housing 31 and is secured by cartridge screws 47 thereto. In this state the o-ring 17 seals between the inside of the center housing 31 and the cartridge. After the compressor wheel 32 is attached to the shaft 34 the compressor housing 29 can directly be fitted to the center housing 31 thereby engaging the electric motor cartridge between the compressor housing 19 and the center housing 31 via contact areas 14, 15 of the cartridge. As the peripheral portions 22 and 23 slightly extend outside the respective cartridge housing 2, 3 a clearance is established between the second cartridge housing 3 and the compressor wheel 32 as well as between the first cartridge housing 2 and the thrust washer 46. Additionally a lock nut 48 is provided for securing the compressor wheel 32 to the shaft 34. Finally the compressor housing 19 and the turbine housing 18 are secured to the center housing 31 via bolts 49 and 50.

The invention is not restricted to the above-described embodiments and can be changed in various modifications.

For example the projection 11 of the stator does not have to continue throughout the whole circumferential extent but may be separated in any number of projections. Accordingly the recesses 9, 10 do not have to be continuously but may be interrupted by corresponding intervals.

The invention claimed is:

1. An electric motor cartridge (1) configured for insertion in a housing and to drive a compressor wheel, the electric motor cartridge (1) comprising:

a first cartridge housing portion (2);

a second cartridge housing portion (3); and a rotor (21);

the cartridge housing portions (2, 3) being coupled together so as to assemble the electric motor cartridge (1) by radially and axially encapsulating a stator (4) there between, wherein each cartridge housing portion (2, 3) has a semi-shell shape substantially comprised by a bottom portion (5, 6) and a cylindrical wall portion (7, 8), wherein at least one of the cylindrical wall portions (7, 8) forms a contact (14, 15) upon insertion of the assembled electric motor cartridge (1) in a housing, wherein one of the bottom portions (6) forms part of a fixed encapsulation barrier between the stator (4) and a compressor wheel to be driven by the assembled electric motor cartridge (1), wherein each cartridge housing portion (2, 3) provides a bore (12, 13) in the center of its bottom portion (5, 6), characterized in that the rotor (21) has peripheral portions (22, 23) inserted through the bores (12, 13) of the cartridge housing portions (2, 3) and a through hole axially extending through the rotor (21) and its peripheral portions (22, 23) for inserting a shaft (34) through the rotor (21).

2. The electric motor cartridge (1) according to claim 1, wherein at least one of the cartridge housing portions (2, 3) is provided with at least one recess portion (9, 10) formed at the inner side of the axial end portion of the cylindrical wall portion (7, 8) which extends at least partially in the circumferential direction of the cylindrical wall (7, 8) for receiving a projection (11) of the stator (4).

3. The electric motor cartridge (1) according to claim 2, wherein each cartridge housing portion (2, 3) is provided with one recess portion (9, 10), wherein the recess portions (9, 10) are symmetrically to a plane defined by the abutting tips of the cylindrical wall end portions.

4. The electric motor cartridge (1) according to claim 3, wherein at least one of the bottom portions (5, 6) is formed at least partly concave inwardly.

5. The electric motor cartridge (1) according to claim 4, wherein at least one contact area (14, 15) is formed at each of the cartridge housing portions (2, 3) so as to be in contact with respective counter contact areas of two housings (31, 19) between which the cartridge (1) is fittable.

6. The electric motor cartridge (1) according to claim 5, wherein in at least one of the cartridge housing portions (2, 3) a circumferentially extending groove (16) is disposed so as to receive an o-ring (17) for sealing between the cartridge housing (2, 3) and one of the two housings (31, 19) between which the cartridge (1) is fittable.

7. The electric motor cartridge (1) according to claim 1, wherein the cartridge housing (2, 3) is made of punched metal, any polymer potted material, any die casting material or any sand casting material.

8. The electric motor cartridge (1) according to claim 7, wherein the properties of the material of the cartridge housing (2, 3) contributes to heat evacuation and heat protection.

9. The electric motor cartridge (1) according to claim 1, wherein the material properties of the cartridge housing contributes to electromagnetic interference protection.

10. The electric motor cartridge (1) according to claim 1, wherein at least one of the cartridge housings (2, 3) comprises a connector portion (20) for phases and sensor connections of a compressor motor.

11. The electric motor comprising an electric motor cartridge (1) according to claim 1 wherein the rotor (21) is encompassed by the stator (4).

12. The electric motor according to claim 11, wherein the rotor (21) comprises two peripheral portions (22, 23) each having a smaller diameter compared to the diameter of a middle portion of the rotor (21) encompassed by the stator, each peripheral portion (22, 23) comprising a circumferential groove (24, 26) provided with a piston ring (25, 27) for sealing between the inside and the outside of the cartridge (1), wherein the rotor (21) is supported at the two peripheral portions (22, 23) by the bores (12, 13).

13. The electric motor according to claim 11, further comprising material removal areas on said rotor (21) providing a unitary rotational mass distribution of the rotor.

14. The electric motor according to claim 11 further comprising a sensor member (28) for detecting the speed of the rotor (21).

15. The electric motor according to claim 11, wherein phases and sensors connections are arranged in the connector portion (20) such that they plug directly to wiring end connections when assembling the compressor motor.

16. A turbocharger comprising an electric motor according to claim 11 and further comprising a turbine housing (18) for accommodating a turbine wheel (29) driven by exhaust gas;

a center housing (31) for accommodating a shaft (34) and the electric motor, the shaft serving as a rotor (21) of the electric motor and extending from the turbine wheel (29) through a journal bearing (35) and the electric motor to a compressor wheel (32);

a compressor housing (19) for accommodating the compressor wheel (32); wherein the compressor wheel (32) is driven by the turbine wheel (29) via the shaft (34) and can additionally be driven by the electric motor, and the electric motor is accommodated in the center housing (31) such that the electric motor is firmly fixed by connecting the center housing (31) to the compressor housing (19).

17. A turbocharger according to claim 16, wherein one of the cartridge housing portions (2) serves as a seal plate on the journal bearing (35) side and the other cartridge housing portion (3) serves as a backplate on the compressor wheel (32) side.

18. A compressor comprising an electric motor according to claim 11 and further comprising a motor housing for accommodating a shaft and the electric motor, the shaft serving as a rotor of the electric motor and carrying a compressor wheel; and a compressor housing for accommodating the compressor wheel; wherein the electric motor is accommodated in the motor housing such that the compressor motor is firmly fixed by connecting the motor housing to the compressor housing.

* * * * *